(12) United States Patent
Tkachenko et al.

(10) Patent No.: US 6,754,602 B1
(45) Date of Patent: Jun. 22, 2004

(54) WIRELESS EMERGENCY LIGHTING SYSTEM

(75) Inventors: Victor Tkachenko, North Hollywood, CA (US); Ram A. Singh, La Canada Flintridge, CA (US)

(73) Assignee: International Valvue Company, Burbank, CA (US)

( * ) Notice: Subject to any disclaimer, the term of this patent is extended or adjusted under 35 U.S.C. 154(b) by 109 days.

(21) Appl. No.: 09/948,447

(22) Filed: Sep. 7, 2001

(51) Int. Cl.[7] .............................................. G01M 19/00
(52) U.S. Cl. ........................................ 702/108; 702/117
(58) Field of Search ................................ 702/108, 117, 702/118, 121; 315/129; 340/540

(56) References Cited

U.S. PATENT DOCUMENTS

| | | | | |
|---|---|---|---|---|
| 4,774,514 A | * | 9/1988 | Hildebrandt et al. | ........ 340/971 |
| 5,337,313 A | * | 8/1994 | Buchholz et al. | .......... 370/94.1 |
| 5,661,468 A | * | 8/1997 | Marcoux | ............... 340/825.44 |
| 5,724,357 A | * | 3/1998 | Derks | ......................... 370/413 |
| 6,538,568 B2 | * | 3/2003 | Conley, III | ................. 340/540 |

* cited by examiner

Primary Examiner—Marc S. Hoff
Assistant Examiner—Paul Kim
(74) Attorney, Agent, or Firm—Thomas I. Rozsa; Tony D. Chen

(57) ABSTRACT

A wireless emergency lighting system for a structural object such as a transportation vehicle. The system includes a multiplicity of discrete wireless emergency lighting assemblies installed in the transportation vehicle at spaced apart locations for assisting passengers of the transportation vehicle to exit the transportation vehicle in an emergency situation. Each emergency lighting assembly has an emergency lighting component, a micro processor for controlling the operations of the emergency lighting component, a memory device for storing information of the emergency lighting component, a battery for providing electrical power to the emergency lighting component, and means for receiving and transmitting radio signals. The system also includes at least one control module for wireless interrogation of the multiplicity of discrete wireless emergency lighting assemblies. The control module has means for receiving and transmitting radio signals, and a memory device for storing raw data received from the emergency lighting assemblies. The system further includes a computer for analyzing the raw data collected by the control module, and diagnosing any problem in the emergency lighting system.

36 Claims, 16 Drawing Sheets

FIG. 9

| CM1 or CM2 or CM3 or CM4 | | |
|---|---|---|
| RAW DATA RAM | SUM | |
| FLOOR LIGHT | 001 | DATA |
| FLOOR LIGHT | 002 | DATA |
| FLOOR LIGHT | 003 | DATA |
| FLOOR LIGHT | 004 | DATA |
| FLOOR LIGHT | 005 | DATA |
| EXIT ID | 001 | DATA |
| EXIT ID | 002 | DATA |
| EXIT ID | 003 | DATA |
| EXIT ID | 004 | DATA |
| EXIT ID | 005 | DATA |
| EXIT ID | 006 | DATA |
| EXIT MARKER | 001 | DATA |
| EXIT MARKER | 002 | DATA |
| EXIT MARKER | 003 | DATA |
| EXIT MARKER | 004 | DATA |
| EXIT MARKER | 005 | DATA |
| EXIT MARKER | 006 | DATA |
| EXIT LOCATOR | 001 | DATA |
| EXIT LOCATOR | 002 | DATA |
| EXIT LOCATOR | 003 | DATA |

FIG.11

WIRELESS EMERGENCY LIGHTING SYSTEM

BACKGROUND OF THE INVENTION

1. Field of the Invention

The present invention relates generally to the field of electrical and electronic control systems and technologies. More particularly, the present invention relates to the field of method of and program for providing airplane emergency lighting and related devices.

2. Description of the Prior Art

Emergency lighting and related devices are very important components of airplane safety systems. Federal regulations requires that in an emergency situation, emergency devices such as the floor lights, exit signs, exit identifiers and markers, exit locators, etc., must remain functional for directing the passengers to safely exit the airplane.

Existing conventional airplane emergency lighting systems are all hard-wired into the airplane's electrical systems. While there are emergency power supply provided to the emergency lighting systems in an emergency situation, the emergency lighting systems are nonetheless still relying on the hardwiring of the airplane. If the structure of the airplane is substantially broken or damaged, then the emergency lighting systems may not be fully functional because the hardwiring system may be damaged.

Another problem with the existing conventional airplane emergency lighting systems is that there is no adequate and efficient way to test the emergency lighting systems during normal maintenance. To examine the emergency lighting systems, they have to be manually turned on and visually inspected by maintenance technicians or members of the flight crew.

A further problem with the existing conventional airplane emergency lighting systems is that when there is a defect or malfunction of certain part of the system, there is no quick and easy way to tell what and/or where is the problem. For example, when the technician discovers that an emergency light is not lighting up, the technician has no quick and easy way to know whether there is a blown lamp, or a defective electronic chip in the unit, or a problem with the wiring system. The technician has to perform a time consuming and laborious procedure to find out exactly what is the problem.

Therefore, it is desirable to provide a new emergency lighting system for an airplane that is not relying on the integrity of the electrical hardwiring system of the airplane during an emergency situation, such that even if the airplane is broken into separate pieces the emergency lighting system will still remain functional.

In addition, it is also desirable to provide a new emergency lighting system for an airplane that can be tested wirelessly, and diagnosed and analyzed with the aid of a computer which will provide fast and precise information as to the status of the system and identify any problem, and even provide instructions to the maintenance technicians as to how to fix the problem.

Furthermore, it is desirable to provide a wireless system that can be installed in other transportation vehicles or stationary structures, which does not rely on the integrity of the electrical hardwiring system of the transportation vehicles or stationary structures, but rather can be controlled and/or tested wirelessly.

SUMMARY OF THE INVENTION

The present invention is a novel and unique wireless system for testing, controlling and operating wireless components which are separately and individually installed in a physical structure.

In a preferred embodiment, the present invention is a wireless emergency lighting system for transportation vehicle such as a commercial airplane.

It is a general object of the present invention to provide a wireless system to sense, test, control and operate discrete wireless components installed in a physical structure.

It is a specific object of the present invention to provide a wireless emergency lighting system to a transportation vehicle such as a commercial airplane.

The present invention is a comprehensive integrated system combining electronic hardware and computer software technologies that utilizes logical protocol assessment and application to interrogate, diagnose, analyze and emulate any or all necessary and essential active or passive operational parameters of the wireless components to establish the real time status of the whole system or its functional components and to identify any malfunctioning or defective components and provide recommendation or instruction of corrective actions.

In the application of commercial airplane, the present invention is an emergency lighting system which includes wireless lighting assemblies and control modules which are non-wire dependent but instead use radio transmitters and receivers for communication. The system also includes a computer for performing analytical tasks. The non-wire dependent emergency lighting assemblies are located at specified locations within the airplane. The control modules serve as interrogators. Upon demand, the control modules interrogate each light assembly to obtain information relevant to their operational condition. The information received by the control modules are retained in their memory and serve as a diagnostic reference database to be used in subsequent analytical processing by the computer. The results of such processing enables the system to reach a logical conclusion of the status of the system and its components. As a result of the information provided in the conclusion, the system defines any necessary corrective action measures to restore the operational parameters to the normal or desired level of performance.

Described specifically, the present invention is a wireless emergency lighting system for an airplane which has a central electrical bus for providing electrical power. The wireless emergency lighting system includes a multiplicity of discrete wireless emergency lighting assemblies installed in said airplane at spaced apart locations for assisting passengers of said airplane to exit said airplane in an emergency situation. Each emergency lighting assembly has an emergency lighting component, a micro processor for controlling the operation of the emergency lighting component, a memory device for storing information of the emergency lighting component, a battery for providing electrical power to the emergency lighting component, and means for receiving and transmitting radio signals. The wireless emergency lighting system also includes a multiplicity of control modules connected to said central electrical bus of said airplane for wireless interrogation of said multiplicity of discrete wireless emergency lighting assemblies. Each control module has means for receiving and transmitting radio signals, and a memory device for storing raw data received from said emergency lighting assemblies. In addition, the wireless emergency lighting system includes a system evaluation status indicator for indicating the operational status of said emergency lighting system based on said raw data collected by said control modules. The wireless emergency lighting system further includes a computer connected to said multiplicity of control modules for analyzing said raw data collected by said control modules, and diagnosing any problem in said emergency lighting system.

Described generally, the present invention is a wireless functional system for a structural object such as a transportation vehicle. The wireless functional system includes a multiplicity of discrete wireless emergency lighting assemblies installed in said transportation vehicle at spaced apart locations for assisting passengers of said transportation vehicle to exit said transportation vehicle in an emergency situation. Each emergency lighting assembly has an emergency lighting component, a micro processor for controlling the operations of the emergency lighting component, a memory device for storing information of the emergency lighting component, a battery for providing electrical power to the emergency lighting component, and means for receiving and transmitting radio signals. The wireless functional system also includes a multiplicity of control modules for wireless interrogation of said multiplicity of discrete wireless emergency lighting assemblies. Each control module having means for receiving and transmitting radio signals, and a memory device for storing raw data received from said emergency lighting assemblies. The wireless functional system further includes a computer for analyzing said raw data collected by said control modules, and diagnosing any problem in said emergency lighting system.

One important advantage of the present invention wireless emergency lighting system is that it does no rely on the integrity of the electrical hardwiring system of the structure during an emergency situation, such that even the structure is damaged or broken into separate pieces the emergency lighting system will still remain functional. It also provides significant inherent safety improvement of the vehicle due to fires arising from the potential of electrical shorts in wired environment.

Another important advantage of the present invention emergency lighting system is that it can be tested, interrogated, diagnosed, and analyzed expeditiously and systematically with the aid of a computer which will provide fast and precise information as to the status of the system and identify any problem, and even provide instructions to the maintenance technicians as to how to fix the problem.

An addition advantage of the present invention is that since the system is totally modular in design, each unit is independent of all other similar units. Therefore, there are no typical system failure modes since individual unit failures are spurious and random in nature. As consequence of the inherent reliability derived from this type of non-wire dependent redundancy, the system is capable in general, to out survive any passenger in the vehicle to assure that it will be functional for any survivor. This is not true for wired technology. Because of the nature of this condition, the present invention system provides a major increase in the survivability op passengers in a survivable accident.

A further advantage of the present invention is that the system also facilitates multiple usage regimes of aircraft such as palletized seating, cargo-combi, all cargo, quick configurations etc due to the absence of wired connections. The present invention system also incorporates a proprietary battery energy consumption sensing design.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 9 is an illustrative sample data format diagram showing the format of the data stored in the read-only memory (RAM) device of each emergency lighting assembly of the present invention wireless emergency lighting system;

FIG. 11 is an illustrative sample database diagram showing the raw data sum stored in the RAM devices of the control modules of the present invention wireless emergency lighting system;

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a system for testing and operating discrete wireless components which are separately and individually installed in a physical structure.

A preferred embodiment of the present invention is a wireless emergency lighting system for transportation vehicle such as a commercial airplane.

Figure 1:
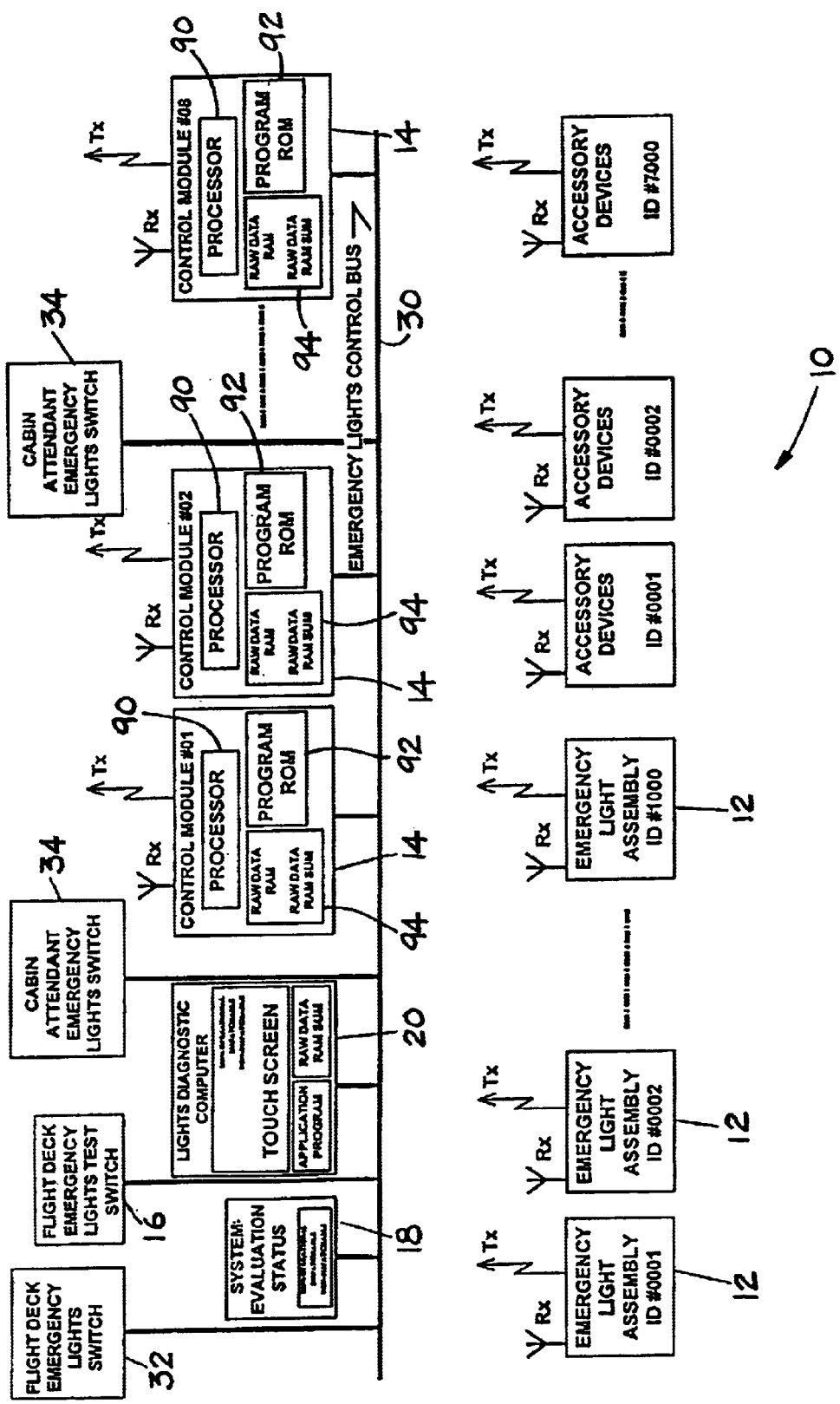
FIG. 1 is an illustrative block diagram showing the structural and functional components of an airplane wireless emergency lighting system as an preferred embodiment of the present invention.

Referring to FIG. 1, there is shown the preferred embodiment of the present invention wireless emergency lighting system 10 installed on a commercial airplane. The wireless emergency lighting system 10 includes a multiplicity of wireless emergency light assemblies 12, a multiplicity of control modules 14, a flight deck emergency lights test switch 16, a system evaluation status indicator 18, and a computer 20.

Figure 2:
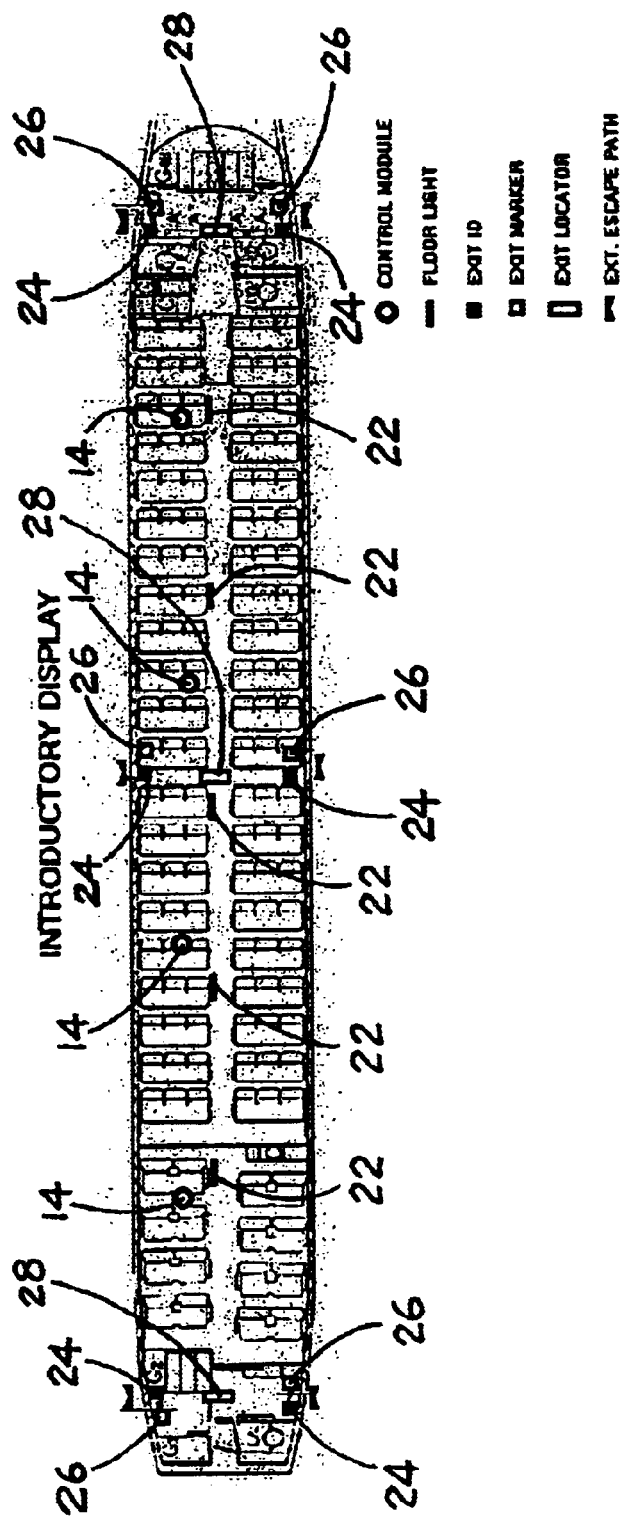
FIG. 2 is an illustrative sample computer screen display of the present invention wireless emergency lighting system for a commercial airplane, showing the physical locations of the wireless emergency light assemblies and control modules installed in the airplane.

Referring to FIG. 2, the multiplicity of wireless emergency light assemblies 12 may include wireless emergency lights 22, wireless exit identifications 24, wireless exit markers 26, and wireless exit locators 28. The wireless exit identifications 24, wireless exit markers 26, and wireless exit locators 28 are all located near the airplane's emergency exit doors or openings. The wireless emergency lights 22 are strategically located in the airplane's main cabin along one or more aisles.

The wireless emergency lights 12 may be mounted on the floor or the aisle seats, or at any suitable places. Each light assembly 12 has two lamps facing opposite directions for illuminating both side of the light assembly 12. The distance between the light assemblies 12 is arranged such that lumination power from one lamp alone can cover the space between two light assemblies 12. This means that the space between two light assemblies 12 is redundantly illuminated by two lamps: one lamp from a light assembly 12 on one end of the space and another lamp from a light assembly 12 on the opposite end of the space. This redundancy ensures that even if a lamp of one light assembly 12 is malfunctioned, its adjacent space will still be illuminated by a lamp of the next light assembly 12.

Referring again to FIG. 1, the control modules 14, flight deck emergency lights test switch 16, system evaluation status indicator 18 and emergency lights diagnostic computer 20 are all connected by hardwiring to the airplane's emergency lights control bus 30 which is also part of the airplane's central electrical bus.

The system is capable of using a non-connected hand-held or portable computer, i.e., the system components may be operated, interrogated, tested, etc., with the use of a separate non-wired hand-held or portable computer.

While some of the system components are shown to be connected to the airplane's central electrical bus 30, the central electrical bus 30 is not essential to the operation of the emergency lighting system 10. It only provides the parameter to monitor the loss of power for the system 10 to activate the emergency lights automatically.

As part of the existing hardwired system, a flight deck emergency lights switch 32 and a multiplicity of cabin attendant emergency lights switches 34 are also connected by hardwiring to the airplane's emergency lights control bus 30. These switches are provided so that members of the flight crew can manually turn on the emergency lighting assemblies 12 either from the flight deck or in the cabin.

Figure 3:
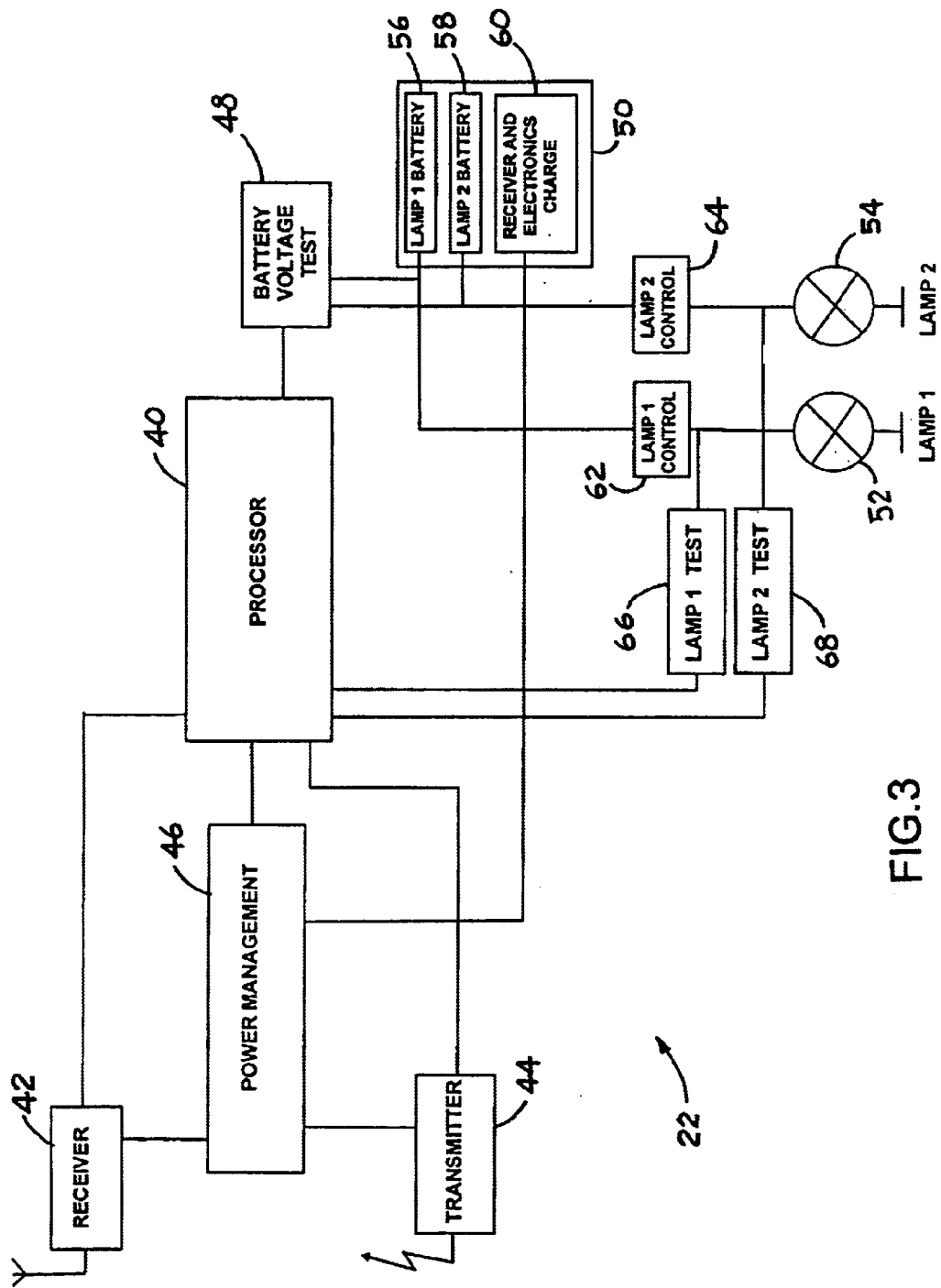
FIG. 3 is an illustrative block diagram showing the structural and functional components of a preferred embodiment of a wireless emergency light assembly of the present invention.

Referring to FIG. 3, there is shown the internal components of an emergency light 22. The electronic circuitry of the emergency light 22 includes a micro processor 40 for controlling the functions and operations of the emergency light 22, a wireless radio frequency receiver 42 for receiving radio signals, a wireless radio frequency transmitter 44 for transmitting radio signals, a power management circuit 46 for managing electrical power consumption of the emergency light 22, a battery voltage test circuit 48, and a battery pack 50.

The emergency light 22 also has two lamps: a first lamp 52 and a second lamp 54. The battery pack 50 has a first battery 56 for providing electrical power to the first lamp 52 and a second battery 58 for providing electrical power to the second lamp 54. The battery pack also has a third battery 60 for providing electrical power to other components and circuits of the emergency light 22.

The electronic circuitry of the emergency light 22 also includes a first lamp control circuit 62 for controlling the functions and operation of the first lamp 52 and a second lamp control circuit 64 for controlling the functions and operation of the second lamp 54, such that each lamp can be independently and separately controlled. The electronic circuitry of the emergency light 22 further includes a first lamp test circuit 62 for testing, interrogating and diagnosing the first lamp 52 and a second lamp control circuit 64 for testing, interrogating and diagnosing the second lamp 54, such that each lamp can be independently and separately tested, interrogated and diagnosed. The first lamp test circuit 62 and the second lamp test circuit 64 may include sensor devices.

Figure 4:
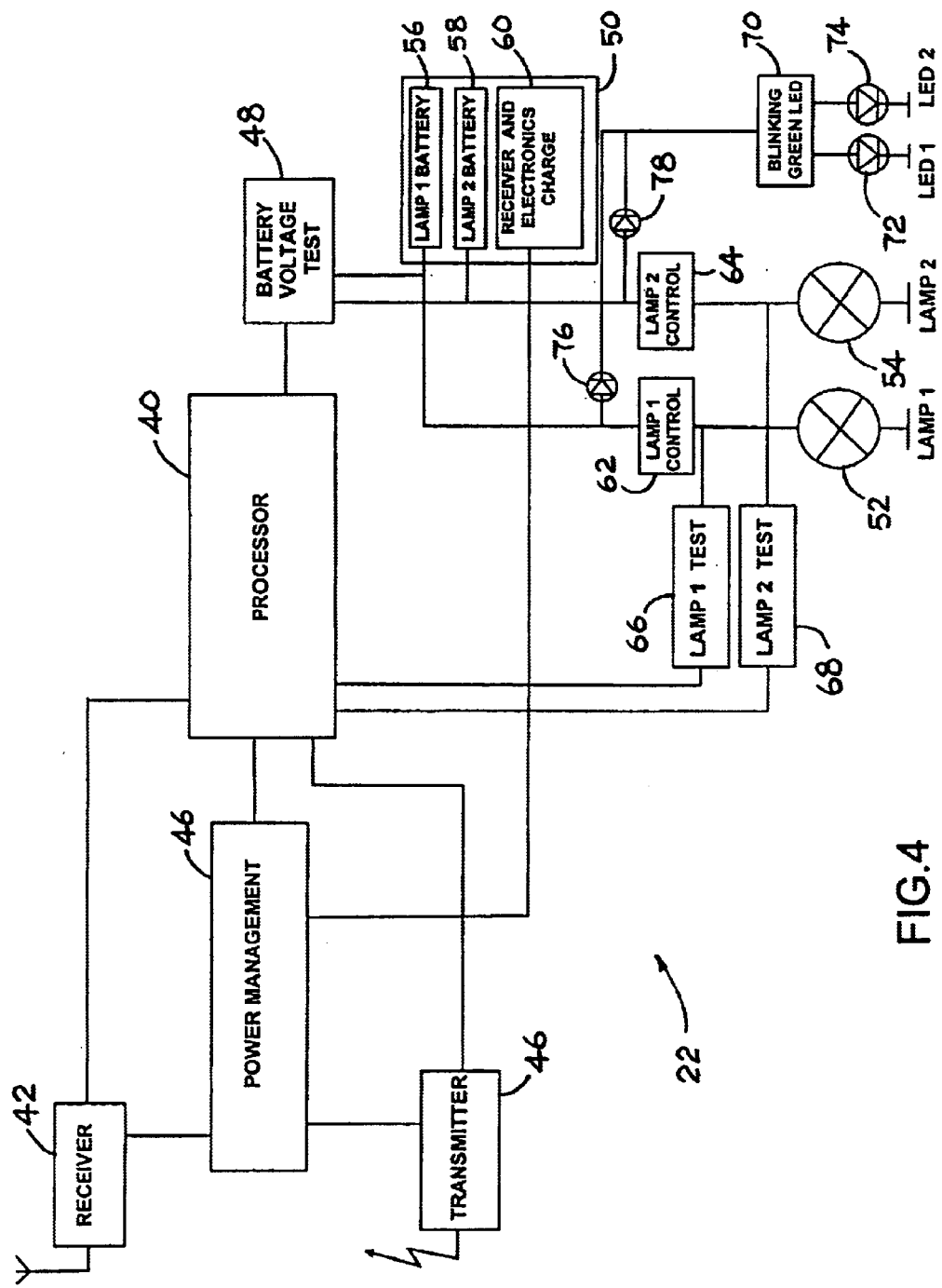
FIG. 4 is an illustrative block diagram showing the structural and functional components of another embodiment of a wireless emergency light assembly of the present invention.

Referring to FIG. 4, there is shown the block diagram of another embodiment of the emergency light 22. In addition to the circuitry components shown in FIG. 2, this alternative embodiment of the emergency light 22 further include a visual indicating device 70 for providing visual indication of the status of the lamp batteries 56 and 58. The visual indicating device 70 includes a first light emitting diode (LED) 72 for indicating the status of the first lamp battery 56, and a second LED 74 for indicating the status of the second lamp battery 58. The visual indicating device 70 is connected to the power line of the first lamp battery 56 through circuit element such as a diode 76, and also connected to the power line of the second lamp battery 58 through circuit element such as another diode 78, such that if any battery runs out of power then the corresponding LED will become dim to indicate that the battery needs to be replaced.

Figure 5:
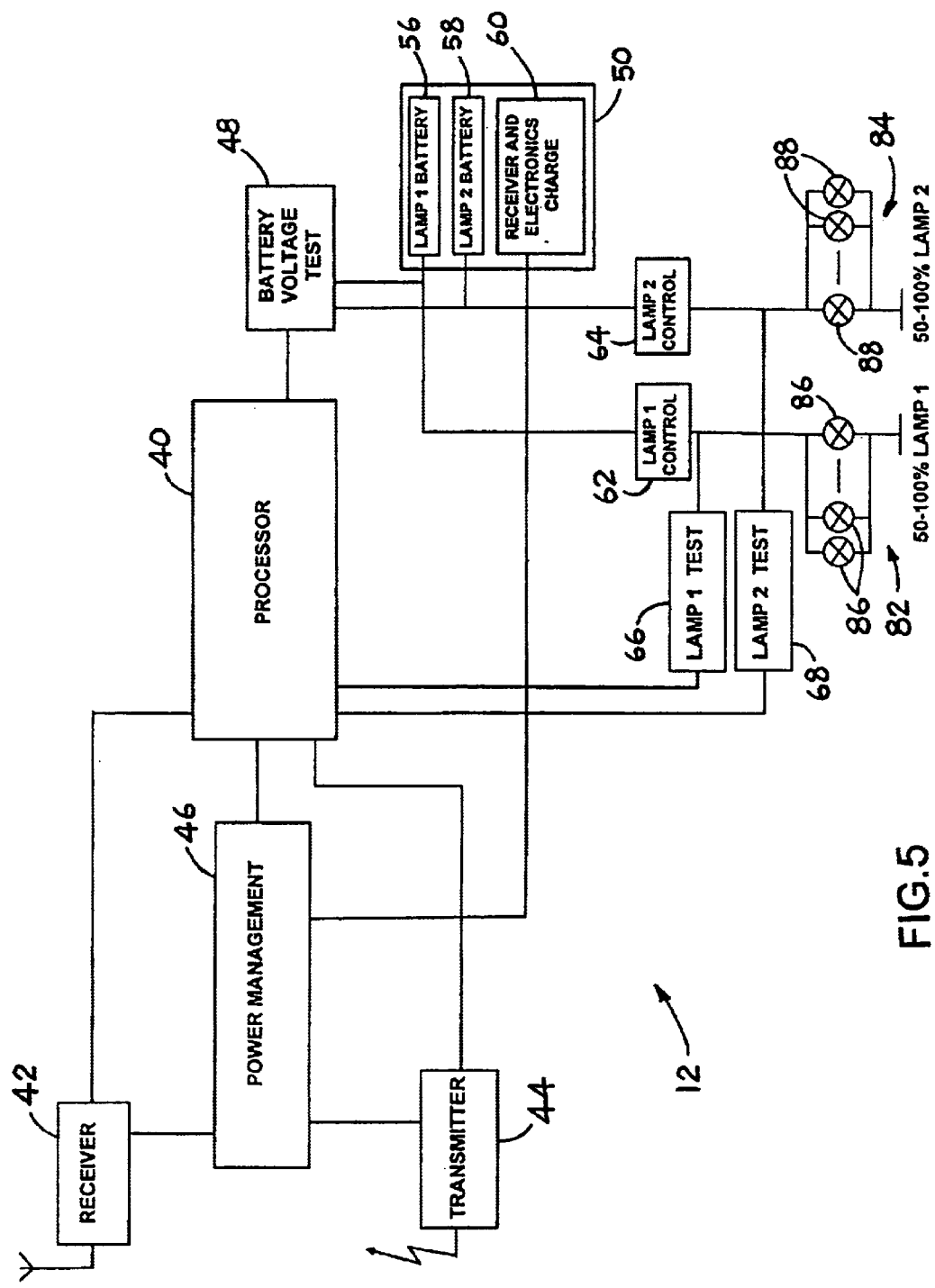
FIG. 5 is an illustrative block diagram showing the structural and functional components of still another embodiment of a wireless emergency light assembly of the present invention.

Referring to FIG. 5, there is shown the block diagram of an embodiment of the emergency lighting assembly 12 which may be a wireless emergency light 22, a wireless exit identification 24, a wireless exit markers 26, and a wireless exit locators 28, where multiple small lamps are used to form a large lamp or a sign that contains letters and/or numbers. Other circuitry elements and components being similar to the ones shown in FIG. 2, the embodiment shown in FIG. 4 utilizes a first group of multiplicity of small lamps 86 to form a first large lamp or sign 82, and a second group of multiplicity of small lamps 88 to form a second large lamp sign or sign 84. The two-lamp arrangement provides the desired redundancy for the operations of the emergency sign, exit locator, exit ID, etc. The parallel arrangement of the small lamps in each group also ensures that the malfunction of any small lamp will not prevent other small lamps in the same group from functioning properly.

Referring again to FIG. 1, the control modules 14 of the wireless emergency lighting system 10 are connected by hardwiring to the emergency lights control bus 30 of the airplane which is also the airplane's main electrical bus for monitoring purposes. When there is a loss of power in the bus 30, the control modules 14 will automatically activate the emergency lighting assemblies 12.

The control modules 14 may use regular batteries for their electrical power, or use rechargeable batteries which can be recharged by the airplane's electrical bus 30. The operation of the control modules 14 does not rely on the power of the airplane's electrical bus 30.

Each control module 14 includes a micro processor unit 90 that is electronically and functionally coupled with a read-only memory (ROM) device 92 which stores program instructions and/or firmware codes for execution by the micro processor unit 90 and one or more random access memory (RAM) devices 94 which store raw data received from the multiplicity of wireless emergency lighting assemblies 12 and the summation of raw data received from other control modules 14. Each control module 14 also includes a radio frequency receiver 96 and a radio frequency transmitter 98 for wireless communication with the wireless emergency lighting assemblies 12 and other control modules 14.

Figure 6:
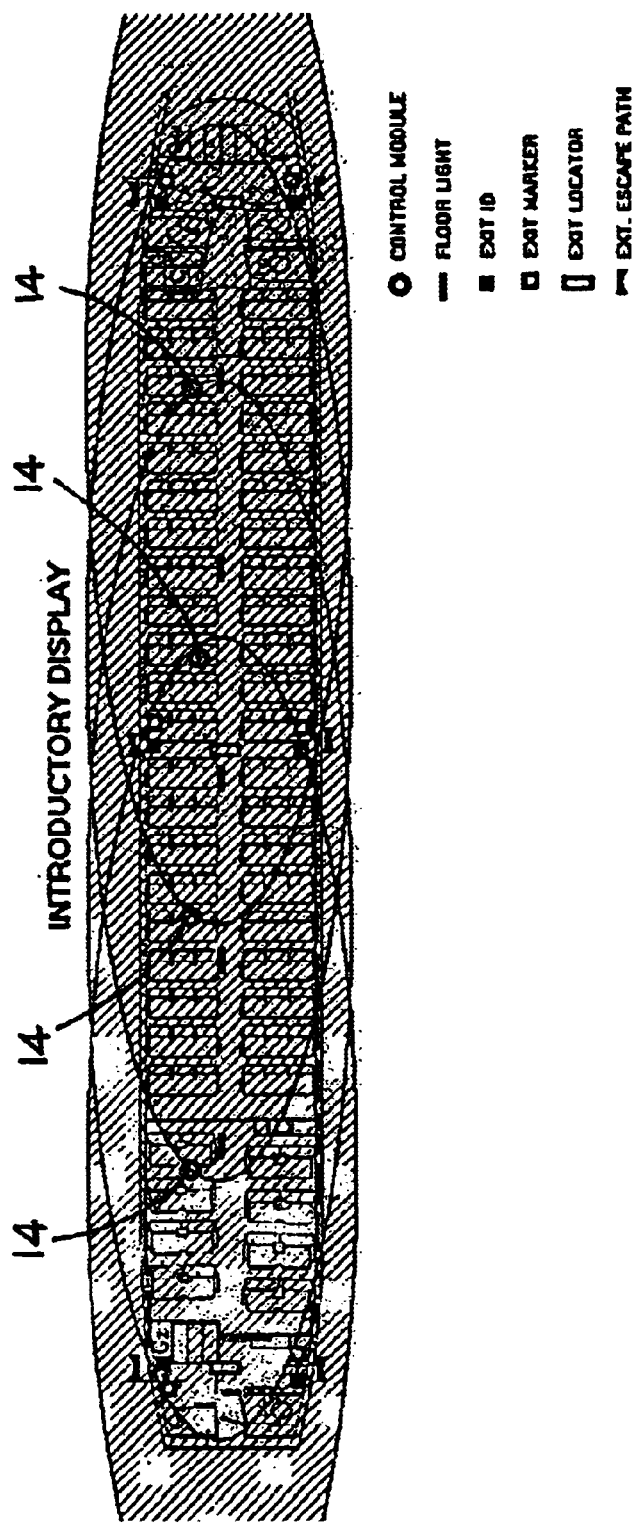
FIG. 6 is an illustrative sample computer screen display of the present invention wireless emergency lighting system for a commercial airplane, showing the radio transmission coverage of each control modules the present invention wireless emergency lighting system.

Referring again to FIG. 6, the multiplicity of control modules 14 are also strategically located in the airplane's main cabin for coverage of all of the multiplicity of wireless emergency lighting assemblies, including the wireless emergency lights 22, wireless exit identifications 24, wireless exit markers 26, and wireless exit locators 28. Because of the airplane's elongated tubular structure configuration, the radio transmission coverage of each control module 14 has a generally oval shaped configuration where the long axis of the oval is parallel to the airplane's elongated tubular structure. The distance between the control modules 14 is adjusted such that each of the multiplicity of wireless emergency lighting assemblies 12 will be within the radio transmission range of and therefore be covered by at least two control modules 14. This redundancy ensures that even if one of the control module 14 is defective or malfunction, the remaining control modules 14 will still provide full radio transmission coverage of all of the multiplicity of wireless emergency lighting assemblies 12.

Figure 7:
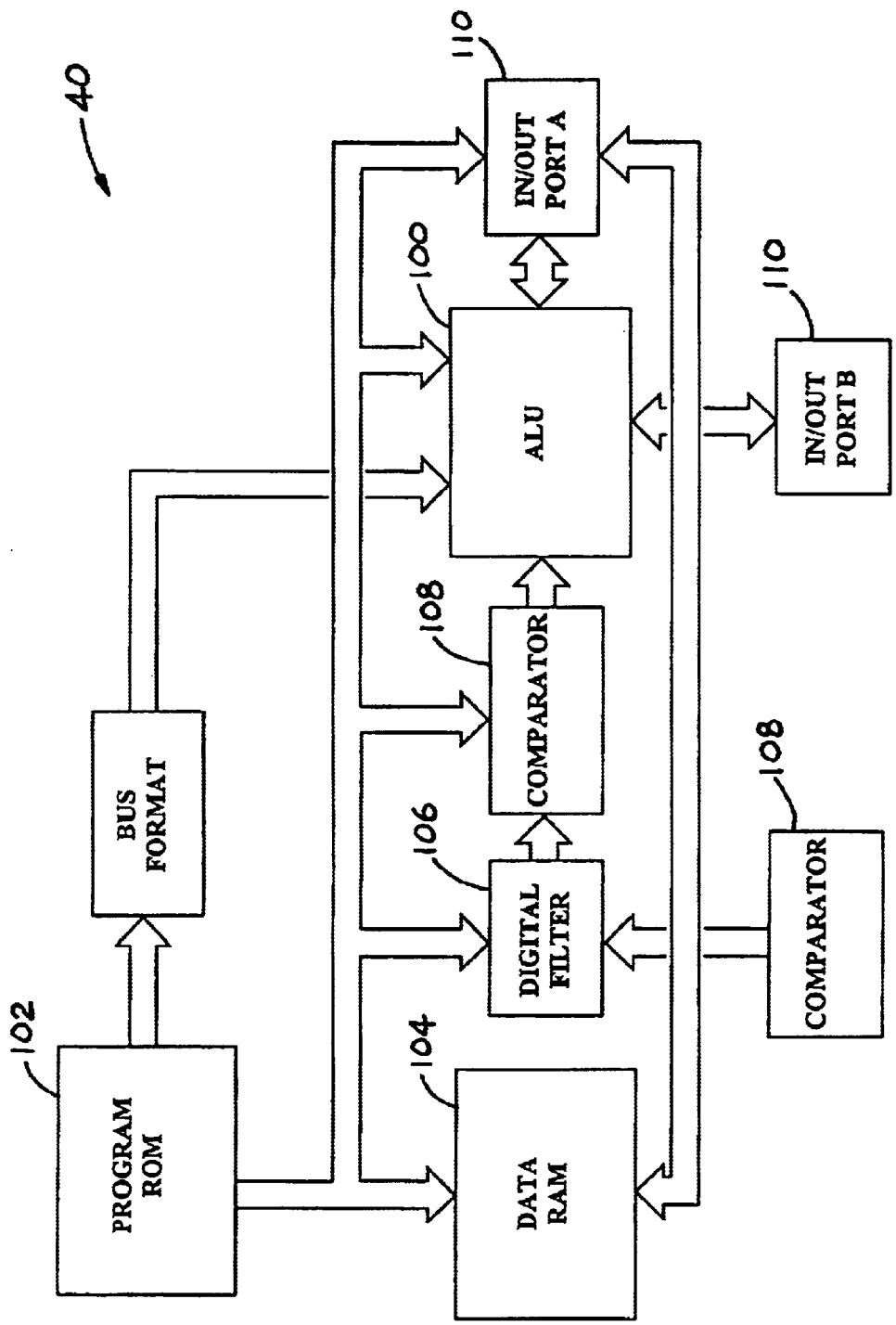
FIG. 7 is an illustrative functional logic block diagram of the micro processor unit of the wireless emergency light assemblies of the present invention wireless emergency lighting system.

Referring to FIG. 7, there is shown the functional logic block diagram of the micro processor unit 40. The center part of the micro processor unit 40 is an analytical logical unit (ALU) 100 which is electrically and functionally coupled with a program ROM 102 and a data RAM 104. The micro processor unit 40 also includes digital filter 106 and comparators 108 as part of the pre-stage circuitry. The micro processor unit 40 further includes one or more input and output (I/O) ports 110 for signal input to and output from the ALU 100.

It is understood that the micro processor unit 90 of the control modules 14 may have similar structural and functional arrangement as described above. These micro processor units are often provided in the form of integrated circuit (IC) chips.

Figure 8:
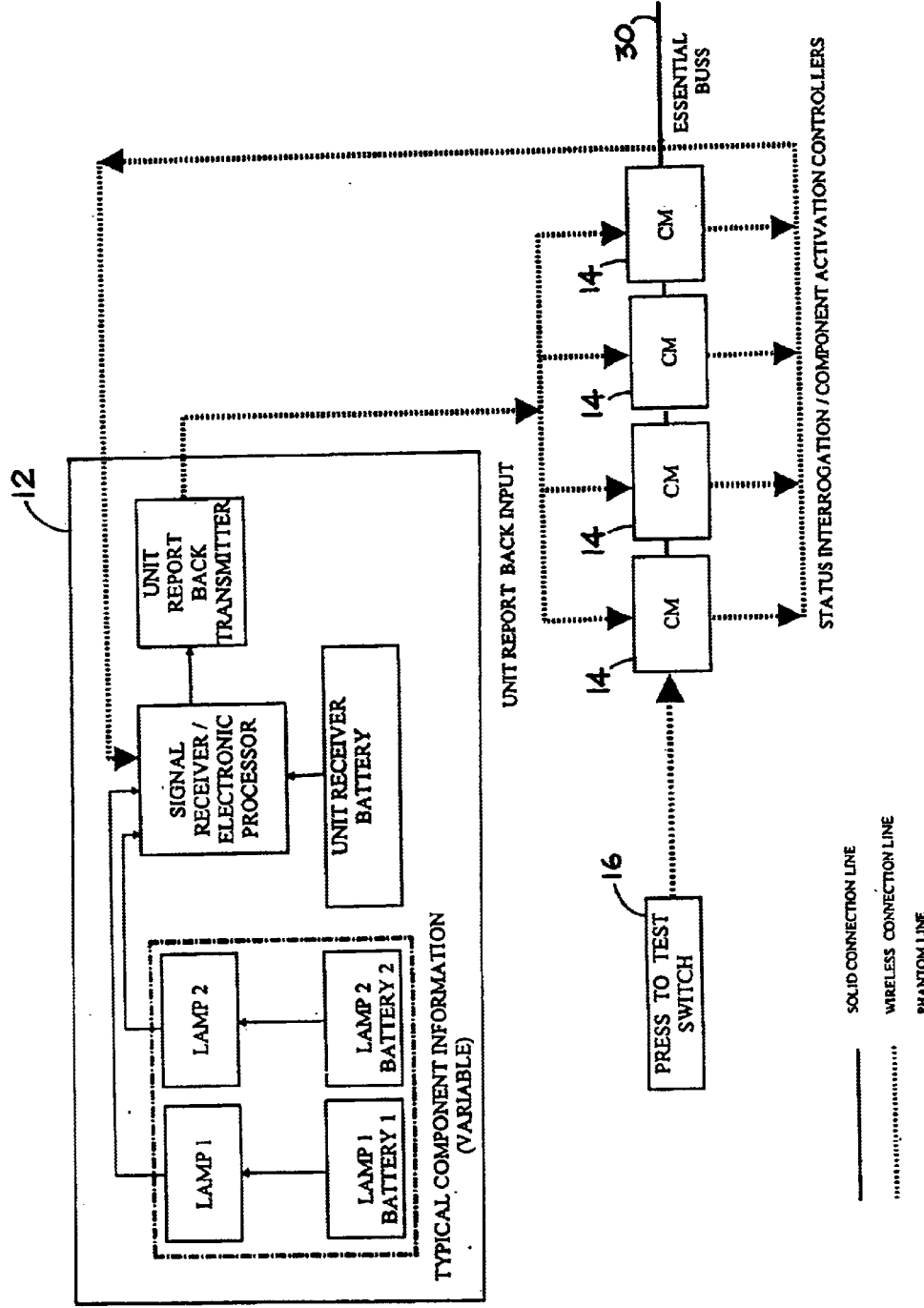
FIG. 8 is an illustrative functional system logic block diagram of the present invention wireless emergency lighting system.

Referring to FIG. 8, there is shown the component interaction functional system logic diagram of the present invention emergency lighting system 10. Component information such as the status of the lamps and batteries is received and stored in the micro processor unit of the emergency lighting assembly 12. These information can be provided upon inquiry to the control modules 14 through wireless communication. The raw data collected by the control modules are provided to and processed by the computer 20, and the status of the system is provided by the system evaluation status indicator 18.

One of the most important features of the present invention wireless emergency lighting system 10 is that it provides a quick and easy way to test the emergency lighting system without actually turning the lights on or relying on visual inspection by members of the service team or the flight crew. The testing routine of the wireless emergency lighting system 10 includes the following essential steps:

1. Switching on the flight deck emergency lights test switch, which may be a physical switch that can be manually switched by a member of the flight crew or technician, or a simulated switch that can be switched by computer program;

2. Interrogating the emergency lighting assemblies by the control modules through wireless communication, where the interrogation signals are transmitted by the transmitters of the control modules and received by the receivers of the emergency lighting assemblies;

3. Reporting component information of the emergency lighting assemblies back to control modules through wireless communication, where the information signals are transmitted by the transmitters of the emergency lighting assemblies and received by the receivers of the control modules;

4. Storing component information of the emergency lighting assemblies as raw data in the control modules, where each particular control module will store the raw data received from the emergency light assemblies that are covered within the radio transmission range of that particular control module;

5. Summarizing component information of all emergency lighting assemblies as raw data sum by each control module through wireless communication between the control modules, where each control module will receive raw data collected by other control modules and add them to the raw data collected by itself, such that each control module will have the raw data of not only the emergency lighting assemblies covered by that control module but also the emergency lighting assemblies covered by other control modules;

6. Evaluating the status of the emergency lighting system based on the raw data sum which contains information of all components of the emergency lighting system, to advise whether the airplane is 100% operational and dispatchable, or is not 100% perfect but reaches a satisfactory level and therefore is nonetheless still dispatchable, or is below the satisfactory level and therefore non-dispatchable; and 7. Analyzing the raw data sum provided by the control modules, diagnosing any problem of the system, identifying the source and/or location of the problem, and providing recommendation and/or instructions for solving the problem.

Figure 9:
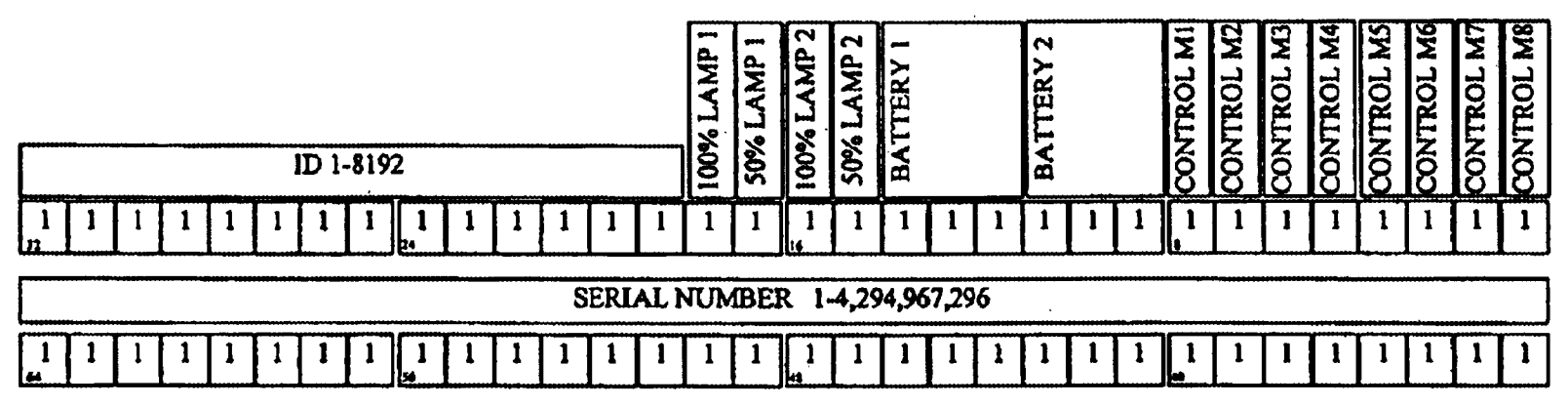

Referring to FIG. 9, there is shown a sample format of the data stored in the RAM of each emergency lighting assembly of the present invention wireless emergency lighting system. The data format provides a database structure for storing critical data of each vital components of the emergency lighting assembly, such as the first lamp, the second lamp, the first battery, the second battery, and so on. The database structure is also designed for storing information concerning the communication between the lighting assembly and the control modules, such as which control modules cover this particular light assembly.

Figure 10:
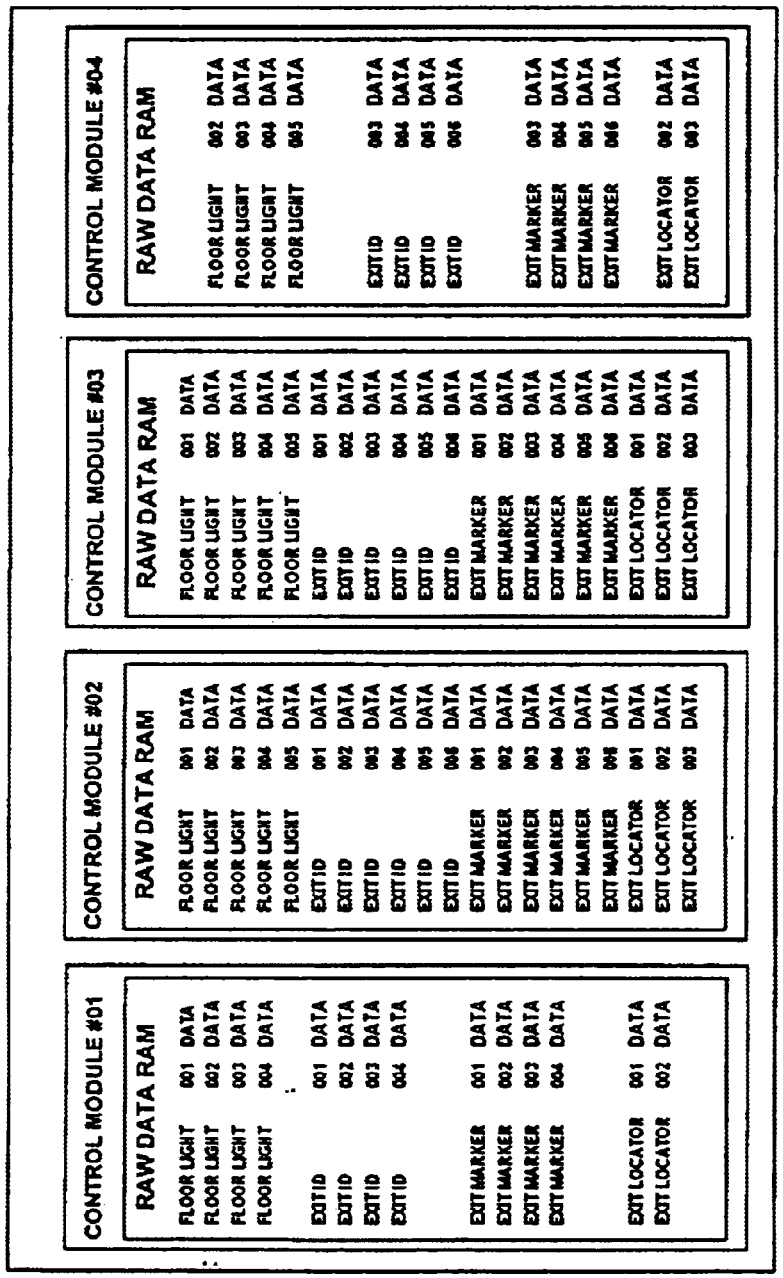
FIG. 10 is an illustrative sample database diagram showing the raw data stored in the RAM devices of the control modules of the present invention wireless emergency lighting system.

Referring to FIG. 10, there is shown the raw data stored in the RAM of the control modules of the present invention wireless emergency lighting system. The raw data stored in the RAM of each control module includes information of all emergency lighting assemblies covered by that particular control module.

Referring to FIG. 11, there is shown the raw data sum stored in the RAM of the control modules of the present invention wireless emergency lighting system. The raw data sum stored in the RAM of each control module includes information of all emergency lighting assemblies covered by all control modules.

Figure 12:
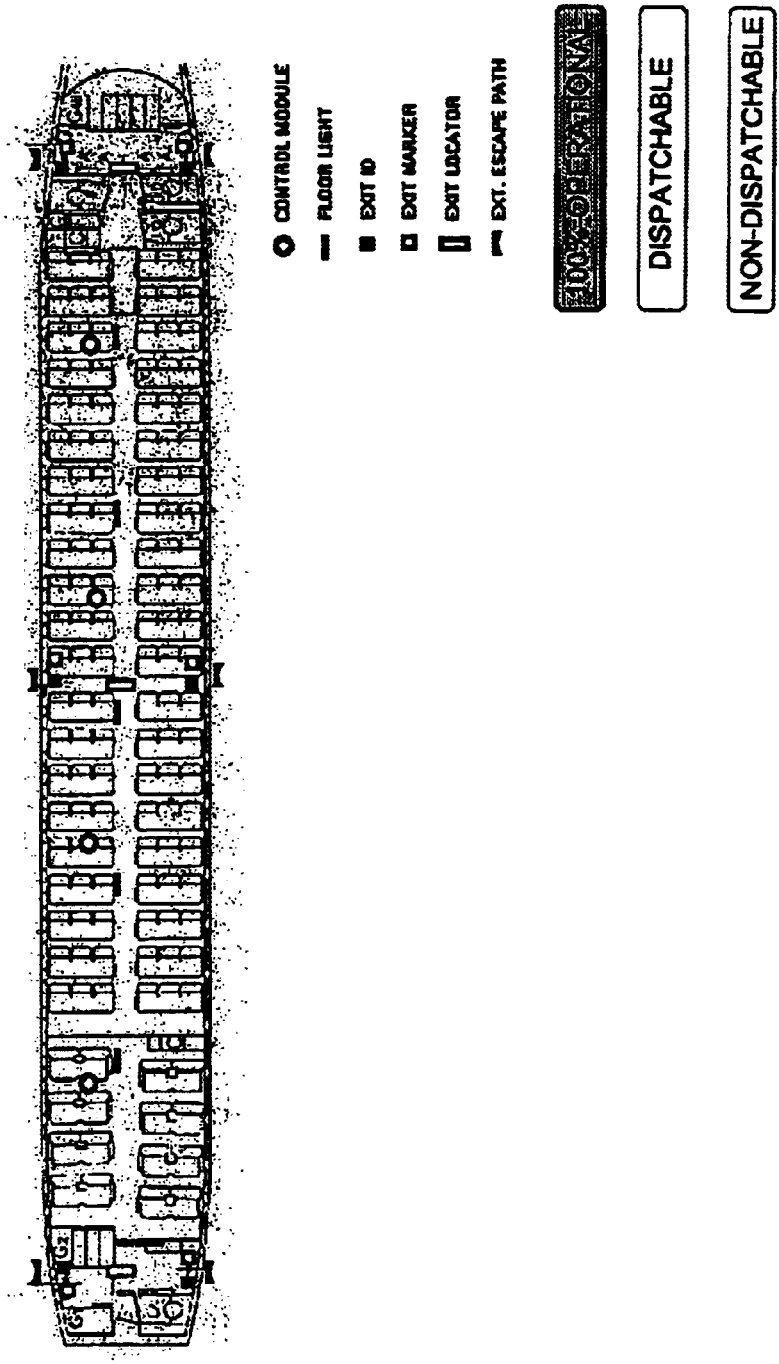
FIG. 12 is an illustrative sample computer screen display of the present invention wireless emergency lighting system for a commercial airplane, showing the system in the 100% operational status.

Referring to FIG. 12, there is shown an illustrative sample computer screen display as displayed on a display screen, preferably a touch screen display screen, of the computer used in the present invention wireless emergency lighting system for a commercial airplane, showing the system in the 100% operational status, which means that all components of the wireless emergency lighting system are operational.

Figure 13:
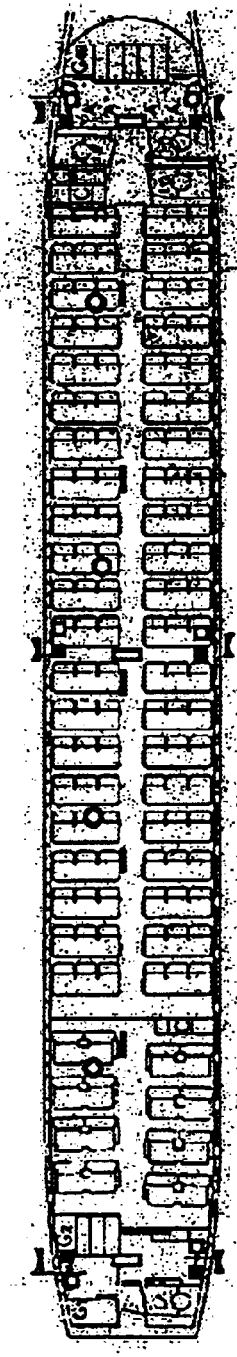
FIG. 13 is an illustrative sample computer screen display of the present invention wireless emergency lighting system for a commercial airplane, showing the system in the dispatchable status.

Referring to FIG. 13, there is shown an illustrative sample computer screen display as displayed on the display screen of the computer used in the present invention wireless emergency lighting system for a commercial airplane, showing the system in the dispatchable status, which means that certain none-critical components of the system may not be operational but the system as a whole nonetheless can satisfy a required level of safety such that the airplane can be dispatched.

Figure 14:
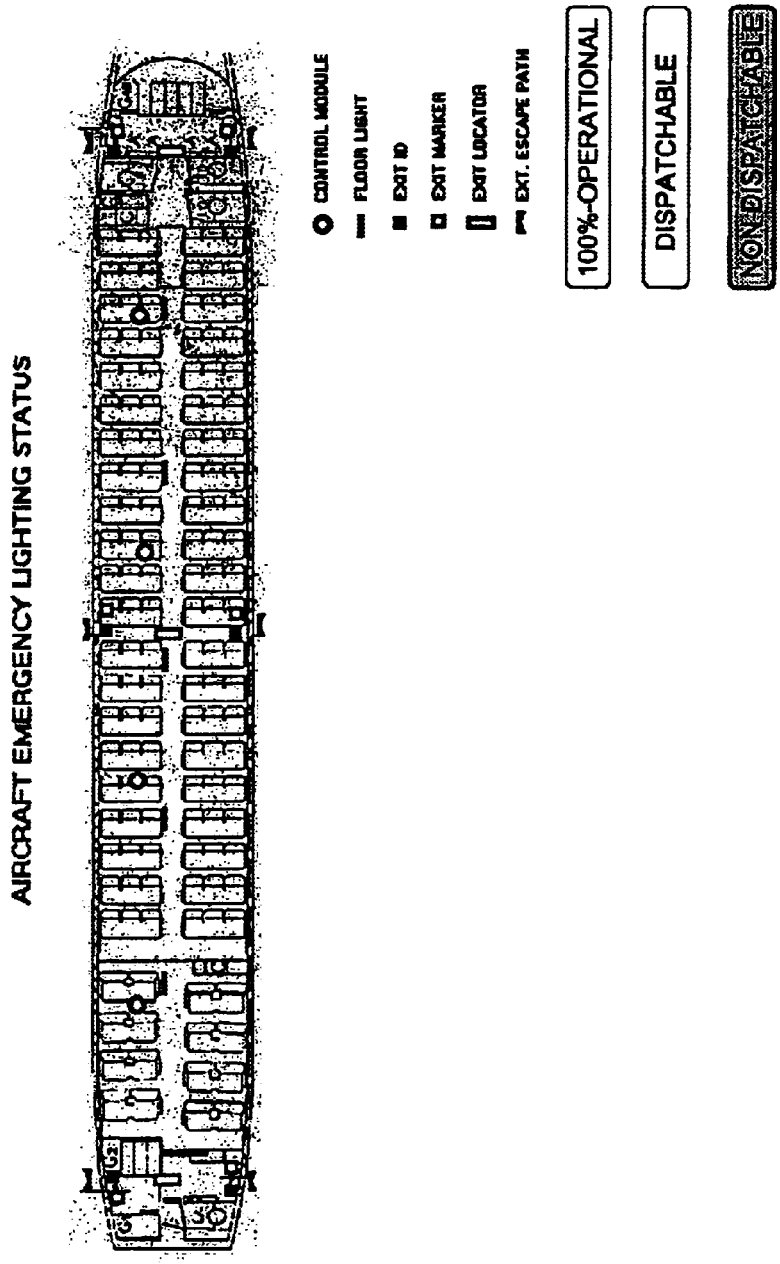
FIG. 14 is an illustrative sample computer screen display of the present invention wireless emergency lighting system for a commercial airplane, showing the system in the non-dispatchable status with identification of the problem needs to be solved to make the system dispatchable.

Referring to FIG. 14, there is shown an illustrative sample computer screen display as displayed on the display screen of the computer used in the present invention wireless emergency lighting system for a commercial airplane. The screen may further provide identification of the problem needs to be solved to make the system dispatchable.

Figure 15:
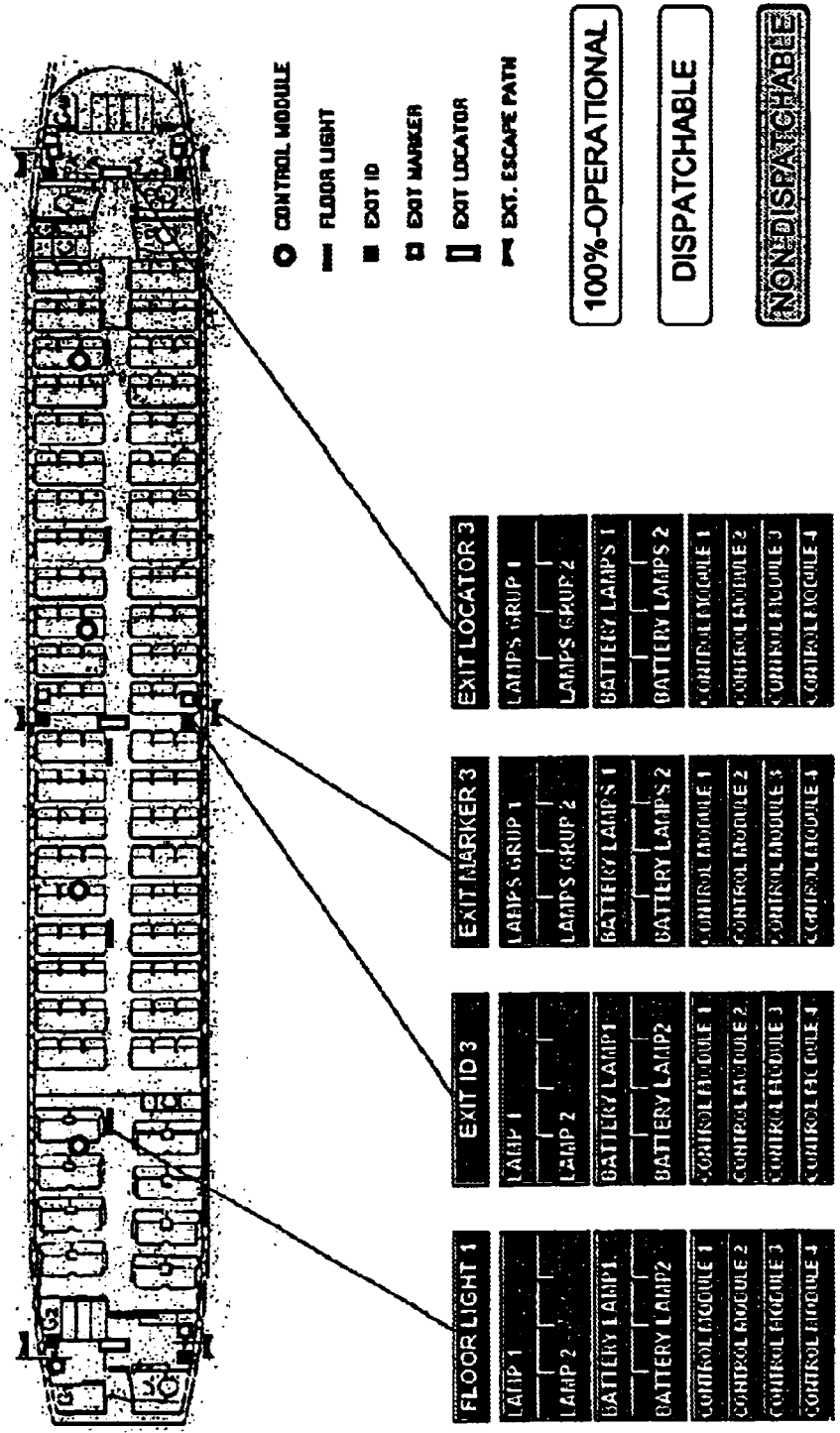
FIG. 15 is an illustrative sample computer screen display of the present invention wireless emergency lighting system for a commercial airplane, showing the system in the non-dispatchable status with identification of the problems need to be solved to make the system 100% operational.

Referring to FIG. 15, there is shown an illustrative sample computer screen display as displayed on the display screen of the computer used in the present invention wireless emergency lighting system for a commercial airplane, showing the system in the non-dispatchable status with identification of the problems need to be solved to make the system not only dispatchable but also 100% operational.

The present invention can be implemented in many applications and is not limited to emergency lighting assemblies. For example, as shown in FIG. 1 which depicts an application of a commercial airplane, the wireless component assemblies may include other accessory devices such as other warning lights, passengers' reading lights, flight attendant call-buttons, in-flight entertainment devices, etc.

In normal operation, the emergency lighting assemblies 12 are in a "sleeping" mode which consumes very limited electrical power. They nonetheless "listen" to the radio signals from the control modules 14 for activation in an emergency situation. The control modules 14 constantly perform monitoring of the airplane's central bus 30 such that if there is a loss of power in the bus, they will automatically activate the emergency lighting assemblies 12. Of course, the emergency light switches 32 and 34 may be manually switched on, in which case the control modules 14 will immediately activate the emergency lighting assemblies 12.

Figure 16:
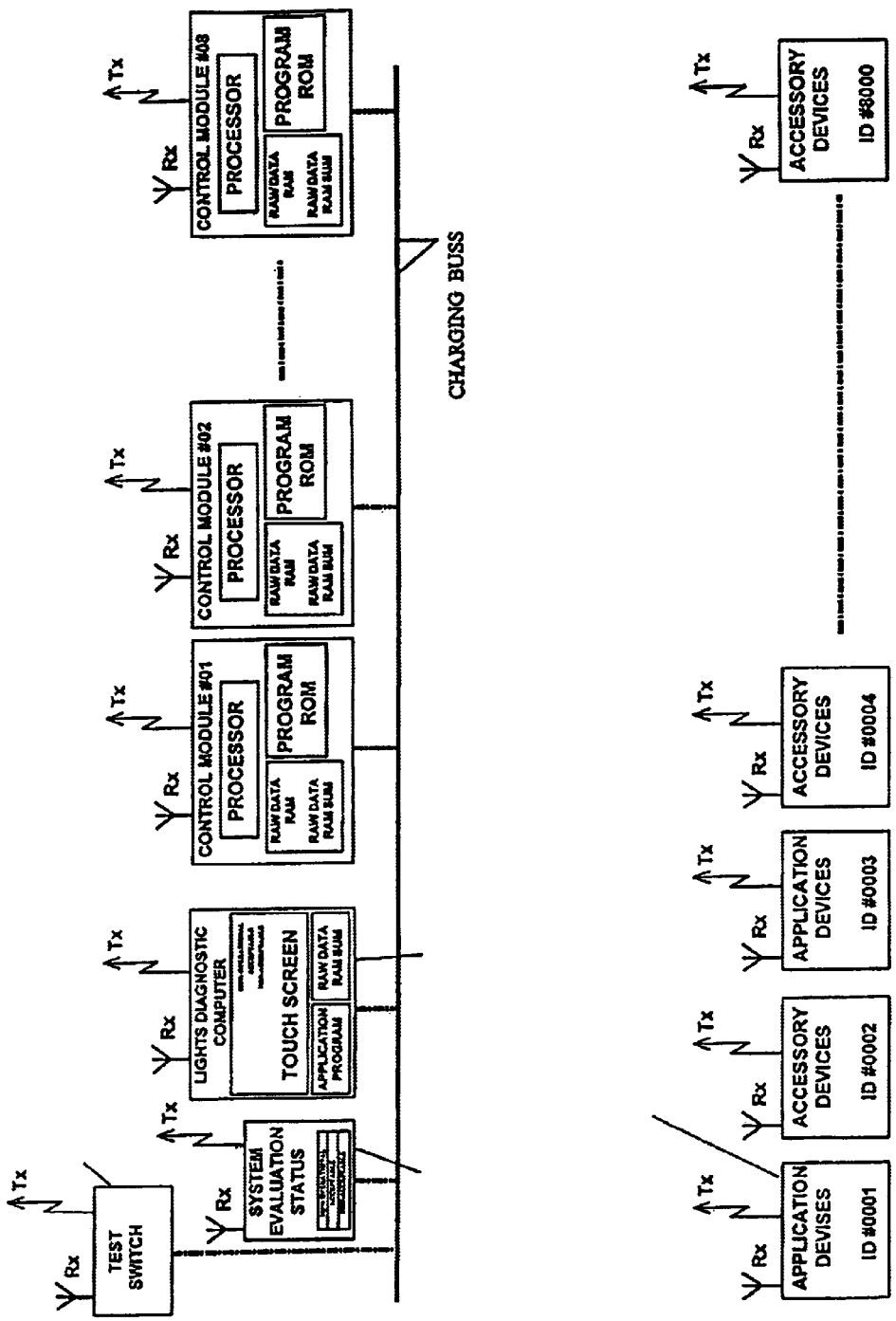
FIG. 16 is an illustrative block diagram showing the structural and functional components of an airplane wireless emergency lighting system as an preferred embodiment of the present invention.

Referring to FIG. 16, the present invention system in general includes a multiplicity of wireless component units which can be application units and/or accessory units, one or more control modules for wireless control of the component units, a system status indicating device, and a computer for analyzing and diagnosing the component information collected by the control modules. This basic arrangement can be implemented in many structural objects which is not limited to airplanes. For example, the present invention system may be used in other transportation vehicles such as trains, boats, space shuttles, etc. The present invention may also be used in stationary structures such as buildings, walls, roads, bridges, tunnels, dams, etc.

The present invention has many advantages. It does no rely on the integrity of the electrical hardwiring system of the structure during an emergency situation, such that even the structure is damaged or broken into separate pieces the emergency lighting system will still remain functional. It can also be tested, interrogated, diagnosed, and analyzed expeditiously and systematically with the aid of a computer which will provide fast and precise information as to the status of the system and identify any problem, and even provide instructions to the maintenance technicians as to how to fix the problem.

In addition, since the present invention system is totally modular in design, each unit is independent of all other similar units. Therefore, there are no typical system failure modes since individual unit failures are spurious and random in nature. As consequence of the inherent reliability derived from this type of non-wire dependent redundancy, the system is capable in general, to out survive any passenger in the vehicle to assure that it will be functional for any survivor. This is not true for wired technology. Because of the nature of this condition, the system provides a major increase in the survivability op passengers in a survivable accident.

The present invention system also facilitates multiple usage regimes of aircraft such as palletized seating, cargo-combi, all cargo, quick configurations etc due to the absence of wired connections.

The present invention wireless system further provides significant inherent safety improvement of the vehicle due to fires arising from the potential of electrical shorts in wired environment.

The present invention system also incorporates a proprietary battery energy consumption sensing design. This allows the system components to operate on batteries in a long duration of time and also provides warning when a battery is low on power and needs to be replaced.

Defined in detail, the present invention is a wireless emergency lighting system for an airplane which has a central electrical bus for providing electrical power, comprising: (a) a multiplicity of discrete wireless emergency lighting assemblies installed in the airplane at spaced apart locations for assisting passengers of the airplane to exit the airplane in an emergency situation, each emergency lighting assembly having an emergency lighting component, a micro processor for controlling the operation of the emergency lighting component, a memory device for storing information of the emergency lighting component, a battery for providing electrical power to the emergency lighting component, and means for receiving and transmitting radio signals; (b) a multiplicity of control modules connected to the central electrical bus of the airplane for wireless interrogation of the multiplicity of discrete wireless emergency lighting assemblies, each control module having means for receiving and transmitting radio signals, and a memory device for storing raw data received from the emergency lighting assemblies; (c) a system evaluation status indicator for indicating the operational status of the emergency lighting system based on the raw data collected by the control modules; and (d) a computer connected to the multiplicity of control modules for analyzing the raw data collected by the control modules, and diagnosing any problem in the emergency lighting system.

Defined broadly, the present invention is a wireless emergency lighting system for a transportation vehicle, comprising: (a) a multiplicity of discrete wireless emergency lighting assemblies installed in the transportation vehicle at spaced apart locations for assisting passengers of the transportation vehicle to exit the transportation vehicle in an emergency situation, each emergency lighting assembly having an emergency lighting component, a micro processor for controlling the operations of the emergency lighting component, a memory device for storing information of the emergency lighting component, a battery for providing electrical power to the emergency lighting component, and means for receiving and transmitting radio signals; (b) a multiplicity of control modules for wireless interrogation of the multiplicity of discrete wireless emergency lighting assemblies, each control module having means for receiving and transmitting radio signals, and a memory device for storing raw data received from the emergency lighting assemblies; and (c) a computer for analyzing the raw data collected by the control modules, and diagnosing any problem in the emergency lighting system.

Defined more broadly, the present invention is a wireless functional system for a structural object, comprising: (a) a multiplicity of discrete wireless component assemblies installed in the structural object for providing certain functional features of the structural object, each component assembly having a functional component, a controller for controlling the operations of the functional component, a memory device for storing information of the functional component, a battery for providing electrical power to the functional component, and means for receiving and transmitting radio signals; and (b) at least one control module for wireless interrogation of the multiplicity of discrete wireless component assemblies, the at least one control module having means for receiving and transmitting radio signals, and a memory device for storing raw data received from the component assemblies.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A wireless emergency lighting system for an airplane which has a central electrical bus for providing electrical power, comprising:

a. a multiplicity of discrete wireless emergency lighting assemblies installed in said airplane at spaced apart locations for assisting passengers of said airplane to exit said airplane in an emergency situation, each emergency lighting assembly having an emergency lighting component, a micro processor for controlling the operation of the emergency lighting component, a memory device for storing information of the emergency lighting component, a battery for providing electrical power to the emergency lighting component, and means for receiving and transmitting radio signals;

b. a multiplicity of control modules connected to said central electrical bus of said airplane for monitoring the status of said central electrical bus and wireless interrogation of said multiplicity of discrete wireless emergency lighting assemblies, each control module having means for receiving and transmitting radio signals where the distances between adjacent control modules are adjusted such that each of said multiplicity of discrete wireless emergency lighting assemblies is within the radio signal transmission range of at least two control modules and therefore covered by said at least two control modules, and each control module further having a memory device for storing raw data received from said emergency lighting assemblies covered by said each control module and also the summation of the raw data received from other control modules such that each control module has raw data of all of said multiplicity of discrete wireless emergency lighting assemblies and said multiplicity of control modules;

c. a system evaluation status indicator for indicating the operational status of said emergency lighting system based on said raw data collected by said control modules; and d. a computer connected to said multiplicity of control modules for analyzing said raw data collected by said control modules, and diagnosing any problem in said emergency lighting system.

2. The system as defined in claim 1, wherein said multiplicity of discrete wireless emergency lighting assemblies include emergency lights.

3. The system as defined in claim 1, wherein said multiplicity of discrete wireless emergency lighting assemblies include emergency exit identification signs.

4. The system as defined in claim 1, wherein said multiplicity of discrete wireless emergency lighting assemblies include emergency exit markers.

5. The system as defined in claim 1, wherein said multiplicity of discrete wireless emergency lighting assemblies include emergency exit locators.

6. The system as defined in claim 1, wherein said emergency light component include one or more lamps.

7. The system as defined in claim 1, wherein said memory device of each said emergency lighting assembly for storing raw data includes at least one random access memory (RAM) device.

8. The system as defined in claim 1, wherein each said emergency lighting assembly further comprises a read-only memory (ROM) for storing program instructions to be executed by said micro processor.

9. The system as defined in claim 1, wherein each said emergency lighting assembly further comprises means for testing said emergency lighting component.

10. The system as defined in claim 1, wherein each said emergency lighting assembly further comprises means for testing said battery.

11. The system as defined in claim 1, wherein said means for receiving and transmitting radio signals of each said emergency lighting assembly include a wireless radio signal receiver.

12. The system as defined in claim 1, wherein said means for receiving and transmitting radio signals of each said emergency lighting assembly include a wireless radio signal transmitter.

13. The system as defined in claim 1, wherein said memory device of each said control module includes at least one random access memory (RAM) device.

14. The system as defined in claim 1, wherein each said control module further comprises a micro processor for controlling the operation of each said control module.

15. The system as defined in claim 14, wherein each said control module further comprises a read-only memory (ROM) for storing program instructions to be executed by said micro processor.

16. The system as defined in claim 1, wherein said means for receiving and transmitting radio signals of each said control module include a wireless radio signal receiver.

17. The system as defined in claim 1, wherein said means for receiving and transmitting radio signals of each said control module include a wireless radio signal transmitter.

18. A wireless emergency lighting system for a transportation vehicle, comprising:

a. a multiplicity of discrete wireless emergency lighting assemblies installed in said transportation vehicle at spaced apart locations for assisting passengers of said transportation vehicle to exit said transportation vehicle in an emergency situation, each emergency lighting assembly having an emergency lighting component, a micro processor for controlling the operations of the emergency lighting component, a memory device for storing information of the emergency lighting component, a battery for providing electrical power to the emergency lighting component, and means for receiving and transmitting radio signals;

b. a multiplicity of control modules for monitoring the status of said transportation vehicle and wireless interrogation of said multiplicity of discrete wireless emergency lighting assemblies, each control module having means for receiving and transmitting radio signals where the distance between adjacent control modules are adjusted such that each of said multiplicity of discrete wireless emergency lighting assemblies is within the radio signal transmission range of at least two control modules and therefore covered by said at least two control modules, and a memory device for storing raw data received from said emergency lighting assemblies covered by said each control module and also the summation of the raw data received from other control modules such that each control module has raw data of all of said multiplicity of discrete wireless emergency lighting assemblies and said multiplicity of control modules; and c. a computer for analyzing said raw data collected by said control modules, and diagnosing any problem in said emergency lighting system.

19. The system as defined in claim 18, wherein said multiplicity of discrete wireless emergency lighting assemblies include emergency lights.

20. The system as defined in claim 18, wherein said emergency light component include one or more lamps.

21. The system as defined in claim 18, wherein said memory device of each said emergency lighting assembly for storing raw data includes at least one random access memory (RAM) device.

22. The system as defined in claim 18, wherein each said emergency lighting assembly further comprises a read-only memory (ROM) for storing program instructions to be executed by said micro processor.

23. The system as defined in claim 18, wherein each said emergency lighting assembly further comprises means for testing said emergency lighting component.

24. The system as defined in claim 18, wherein each said emergency lighting assembly further comprises means for testing said battery.

25. The system as defined in claim 18, wherein said means for receiving and transmitting radio signals of each said emergency lighting assembly include a wireless radio signal receiver.

26. The system as defined in claim 18, wherein said means for receiving and transmitting radio signals of each said emergency lighting assembly include a wireless radio signal transmitter.

27. The system as defined in claim 18, wherein said memory device of each said control module includes at least one random access memory (RAM) device.

28. The system as defined in claim 18, wherein each said control module further comprises a micro processor for controlling the operation of each said control module.

29. The system as defined in claim 28, wherein each said control module further comprises a read-only memory (ROM) for storing program instructions to be executed by said micro processor.

30. The system as defined in claim 18, wherein said means for receiving and transmitting radio signals of each said control module include a wireless radio signal receiver.

31. The system as defined in claim 18, wherein said means for receiving and transmitting radio signals of each said control module include a wireless radio signal transmitter.

32. The system as defined in claim 18 further comprising a system evaluation status indicator for indicating the operational status of said emergency lighting system based on said raw data collected by said control modules.

33. The system as defined in claim 18 wherein said transportation vehicle is a commercial airplane.

34. The system as defined in claim 18 wherein said transportation vehicle is a ground transportation vehicle.

35. The system as defined in claim 18 wherein said transportation vehicle is a water vessel.

36. The system as defined in claim 18 wherein said transportation vehicle is a space ship.

* * * * *